April 10, 1928.   K. GLÄSSEL   1,665,878
REGULATING DEVICE FOR REFRIGERATING MACHINES
Filed March 20, 1925   2 Sheets-Sheet 1
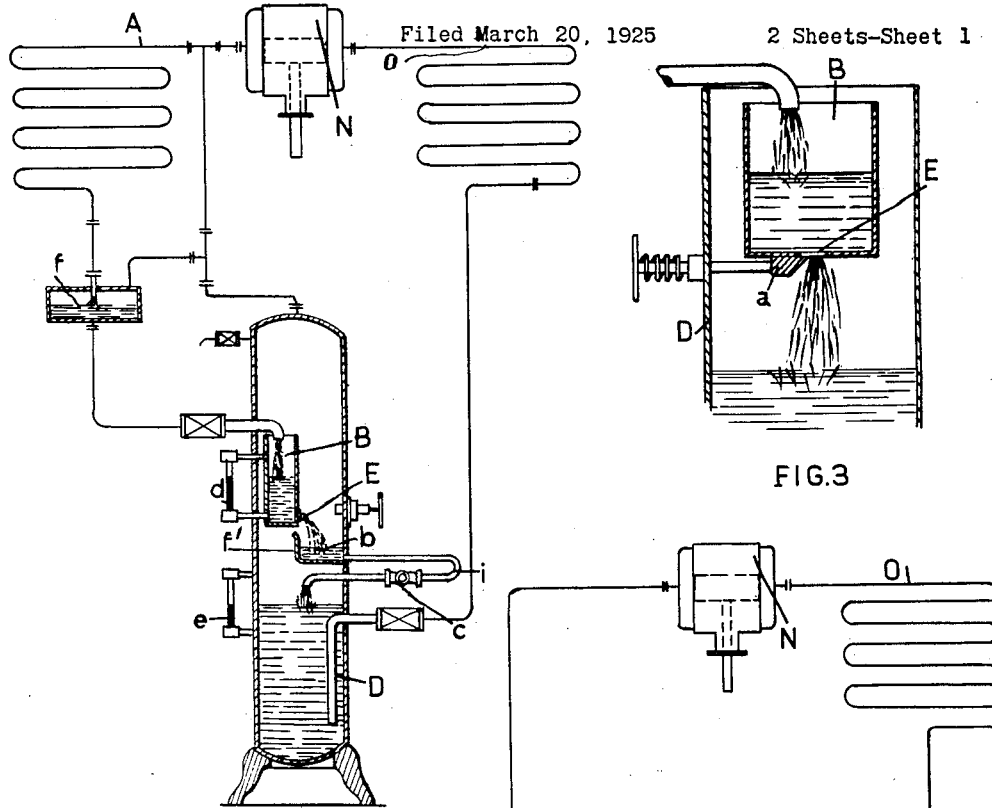
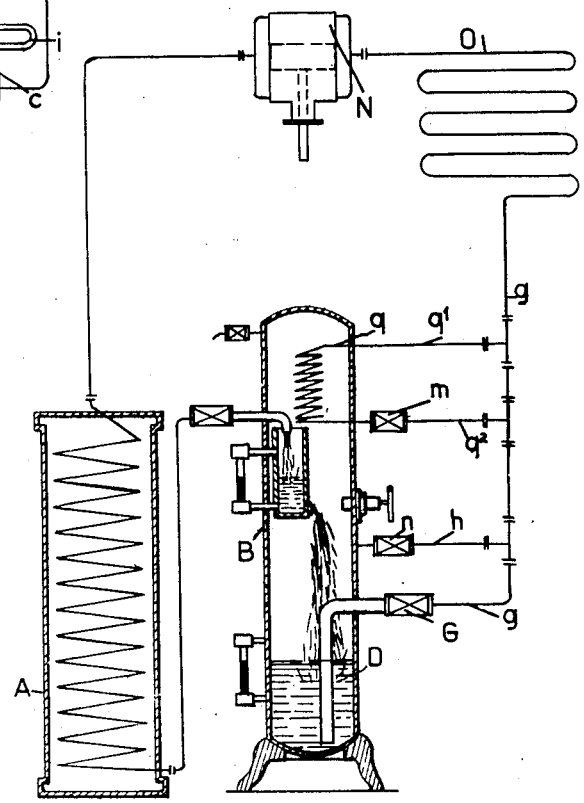
Inventor:
Karl Glässel
by: Hubert G. R.
Attorney.

April 10, 1928. 1,665,878
K. GLÄSSEL
REGULATING DEVICE FOR REFRIGERATING MACHINES
Filed March 20, 1925  2 Sheets-Sheet 2

Inventor:
Karl Glässel
by: Herbert S. R.
Attorney.

Patented Apr. 10, 1928.

1,665,878

UNITED STATES PATENT OFFICE.

KARL GLÄSSEL, OF CANNSTATT, GERMANY.

REGULATING DEVICE FOR REFRIGERATING MACHINES.

Application filed March 20, 1925, Serial No. 17,093, and in Germany May 6, 1924.

There are known regulating devices for refrigerating machines, in which two superposed vessels for the passage of the liquid cold-producing medium are arranged between the condenser and the regulating valve, said two vessels being connected with one another by an orifice, and each thereof enclosing a float, with the aid of which the level of the liquid within the said vessel is made visible on the outside by means of suitable transmisson-members.

Figure 4:
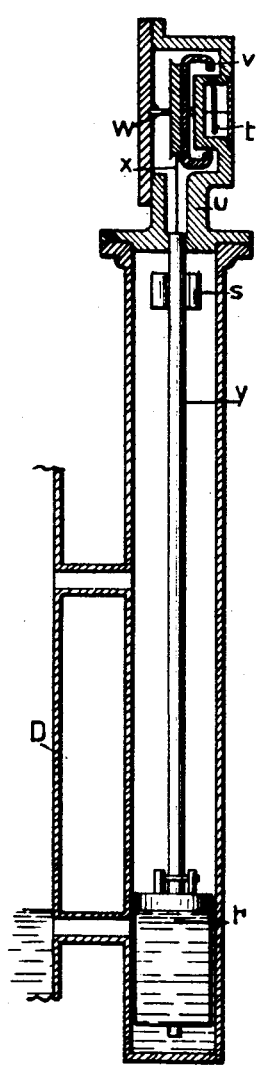
Figure 6:
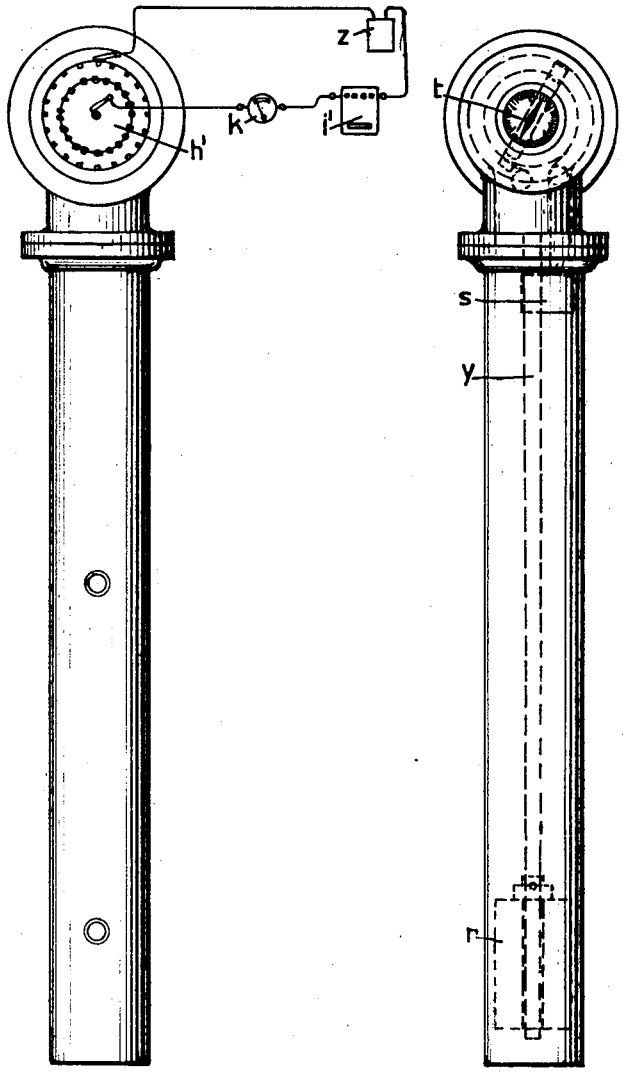
Figure 5:
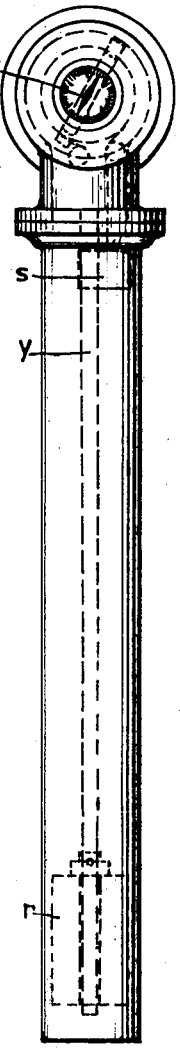

This known arrangement and combination of parts is possessed of certain drawbacks which are obviated by my present invention, several constructional forms of which are illustrated diagrammatically and by way of example in the accompanying drawing in which Figure 1 is a side-view of the first modification thereof, partly in vertical section; Figure 2 is a similar illustration showing another constructional form; Figure 3 shows some details pertaining to the middle portion of the controlling vessel (D) of Figs. 1 and 2; this Figure 3 being drawn to an enlarged scale; Figure 4 is a vertical section through a level indicating device for use in connection with said main vessel; Figure 5 is a side-view of another indicating device, and Figure 6 is a similar illustration showing a modification of Figs. 4 and 5. these Figs. (4, 5, 6) being drawn to a still more enlarged scale.

Referring to Fig. 1 A denotes the condenser or liquefier, B a measuring vessel, D a controlling vessel, O the evaporator, and N the compressor.

The amount of refrigerating liquid flowing in the unit of time through the orifice E of the measuring vessel B depends upon the sectional area of this orifice and upon the head of said liquid within said vessel. With plants with great fluctuations of the output, that is to say, with great fluctuations of the amount of refrigerating liquid flowing therethrough, or, in other words: with plants in which run alternately one or two or three compressors, a very long inspection glass is required. To do away with this, several orifices either of equal size or of different sizes are provided instead of one orifice, those several orifices being provided with means permitting them to be closed one after another; or the sectional area of an orifice is rendered variable, as is the case, for instance, in Fig. 3, in which the one orifice E there provided can be closed more or less by a slide $a$. This slide may be a flat slide, or a piston-slide; or any equivalent member may be provided for it.

If the orifice of the measuring vessel B is invariable, the supply will vary with the number of compressors running at a time. Since it is desired to have as much liquid escape from the orifice E as is supplied to the vessel B, a variable head should be employed. As, however, the object of the entire arrangement and combination of parts is to employ the head as measure for the amount of liquid passing through in the unit of time, a larger vessel would lead to a wrong result because the amount of liquid accumulated therein would not be considered when the head is being read off. But even apart from this, the size of the vessel is limited by practical considerations, as is also the head, and it is for this reason that the sectional area of the orifice E is made variable.

I am aware of the fact that it is known to provide a pressure-equalizing tube between the two vessels. I am doing however without such a pipe in that I am arranging the first vessel within the second, that is to say, the measuring vessel within the controlling vessel, as is illustrated in the constructional forms shown by way of example in Figs. 1 and 2, the equalization of the pressure taking place now in the most perfect manner imaginable.

In order to render it possible to ascertain over a period of time of any desired or distinct length, the output of the machine with the aid of the output read off at the scale at any desired moment, the jet of liquid flowing forth from the orifice E is intercepted at $b$ (Fig. 1) and conducted through a water-meter $c$ inserted into a pipe $i$ extending from a pre-accumulating vessel $f'$ to the lower part of the controlling vessel D. It is, in connection with this procedure, essential that the pressure-fluctuations always existing in the refrigerating machine do not exert any influence upon the measurement, as the pressures before and after the water-meter are not completely compensated. Fig. 1 shows also that now ordinary gauge-glasses $d$ and $e$ can be used instead of float-gauges.

Further, to render possible a constant supply of the liquid to the controlling vessel D even if the output of the condenser fluctuates, the vessel $f$ is provided in which a compensation takes place if suddenly more or less liquid passes through.

In Fig. 2 the case is illustrated in which the local conditions of a plant are such that the condenser A is arranged more deeply than the controlling vessel D. There is, in this case, no natural supply; to constitute it, the pressure in the controlling vessel is reduced by so much as corresponds to the difference in height between the condenser and said vessel; this reduction of the pressure can be effected in two ways which are as follows:

Firstly: The gas-space of the controlling-vessel and the pipe $g$ connecting the regulating valve G with the evaporator O are connected with one another by a pipe $h$ furnished with a valve $n$; this valve may be a reducing valve or adapted to be adjusted manually.

Secondly: The reduction of the pressure is effected by causing condensation of the ammonia-vapor present in the gas-space of the controlling-vessel D. That condensation is effected by means of a coiled pipe $q$ through which flows away either a suitable part, or the entire amount, of the cold liquid flowing away through the reducing valve. The coil $q$ is inserted between two pipes $q^1$ $q^2$ connected at their other ends with the pipe $g$; $m$ is a valve inserted into the pipe $q^2$.

It may be that the above-mentioned watermeter $c$ does not deliver sufficiently accurate indications if the amount of liquid passing there through is very small. This drawback is obviated by means of the gauges illustrated in Figs. 4–6, in which a magnetic needle is employed. The float $r$ is balanced by a counter-poise $s$, and the magnetic needle $t$ does not move rectilinearly, but is rotatory. $u$ denotes a casing of non-magnetic material, and $v$ a drum carried by an axle $w$ and adapted to turn thereon. The drum $v$ carries a chain or a rope $x$, one end of which is connected with the float $r$, and the other end with the counter-poise $s$. $y$ is a guide-tube for the rope-portion or chain-portion passing down to the float. The magnet $t$ is attached to the drum $v$, and outside the casing $u$ the magnetic needle $t$ is arranged centrally with respect to the drum. The magnetic needle co-operates with a scale upon which it indicates the position of height of the float, or the cold-output at the time being respectively.

The constructional form of the gauge shown in Figs. 4 and 5 is intended for local reading. For distance indication resource can be taken to an electric circuit, as is the case in the constructional form shown in Fig. 6, in which $z$ denotes the source of current, $h'$ a resistance, and $k$ a current-meter. The resistance $h'$ is composed of a disk affixed to an axle $w$, and of a plurality of resistance-coils. The resistance of the circuit is varied according to the position of the float by means of suitably arranged sliding contacts, that variation entailing a corresponding variation also of the strength of the current. The current-indicator presents, therefore, a means for informing about the height of the level of the liquid, as well as about the cold-output. A current-meter $i'$ inserted into the circuit indicates the amount of liquid that has passed through the machine in any desired period of time, or the amount of the cold produced in that period respectively. It is, by this means, rendered possible to ascertain also the output of the machine, besides the known ascertainment of the consumption (of coal, current, etc.).

The device shown in Fig. 6 can be modified in this way that an iron core is located in a nonmagnetic casing, and a permanent magnet is arranged on the axle of the indicating hand.

I claim:

1. A device for regulating refrigerating machines, comprising, in combination: a compressor, a condenser, a regulating valve, two vessels serving for conducting the refrigerating liquid from the condenser to the regulating valve, one of said vessels being arranged within the other vessel in such a manner as to be superposed to the latter, so that a drop of flow is produced between said two vessels, an orifice provided in said superposed vessel and establishing a communication between said vessels, means for regulating the cross sectional area of said orifice, and a vessel arranged between said condenser and the upper one of the before mentioned two vessels.

2. A device for regulating refrigerating machines, comprising, in combination: a compressor, a condenser, a regulating valve, two vessels serving for conducting the refrigerating liquid from the condenser to the regulating valve, one of said vessels being arranged within the other vessel in such a manner as to be superposed to the latter, so that a drop of flow is produced between said two vessels, an orifice provided in said superposed vessel and establishing a communication between said vessels, means for regulating the cross sectional area of said orifice, a vessel arranged between said condenser and the upper one of the before mentioned two vessels, and a water-meter arranged between said two vessels, and communicating with them.

3. A device for regulating refrigerating machines, comprising, in combination: a compressor, a condenser, a regulating valve, two vessels serving for conducting the refrigerating liquid from the condenser to the regulating valve, one of said vessels being arranged within the other vessel in such a manner as to be superposed to the latter, so that a drop of flow is produced between said two vessels, an orifice provided in said superposed vessel and establishing a communication between said vessels, means for regulating the cross sectional area of said orifice, and a liquid gauge comprising a closed casing, a float therein, a counter-poise, means connecting said float and said poise with each other, another closed casing connected with the first casing, a rotatable magnet therein, mechanical means adapted to transmit the movement of said float to said magnet, and a magnetic needle arranged outside of said second casing in such a relation thereto, as to be actuated thereby.

In testimony whereof I affix my signature.

KARL GLÄSSEL.